United States Patent [19]

Kontz et al.

[11] Patent Number: 4,497,681

[45] Date of Patent: Feb. 5, 1985

[54] APPARATUS AND METHOD FOR APPLYING HEAT SHRINKABLE CONICAL PLASTIC LABELS ON CONTAINERS

[75] Inventors: Robert F. Kontz, Toledo; Gary L. Moore, Swanton, both of Ohio

[73] Assignee: Owens-Illinois, Inc., Toledo, Ohio

[21] Appl. No.: 550,412

[22] Filed: Nov. 10, 1983

[51] Int. Cl.$^3$ .......... B29C 7/30

[52] U.S. Cl. .......... 156/363; 53/585; 156/443; 156/569

[58] Field of Search .......... 156/86, 443, 475, 572, 156/363, 364, 571, 569; 53/582, 585, 291, 287, 307, 295

[56] References Cited

U.S. PATENT DOCUMENTS

| | | | |
|---|---|---|---|
| 1,875,110 | 8/1932 | Myers | 53/585 X |
| 1,971,576 | 8/1934 | Nelson | 53/585 X |
| 2,089,769 | 8/1937 | Strout | 53/585 X |
| 2,967,636 | 1/1961 | Manas et al. | 156/364 |
| 4,215,460 | 8/1980 | Amberg et al. | 156/86 X |
| 4,387,553 | 6/1983 | Strub et al. | 53/585 |

*Primary Examiner*—David Simmons

*Attorney, Agent, or Firm*—John R. Nelson; Myron E. Click

[57] ABSTRACT

Apparatus and methods of applying a preformed conical heat-shrinkable plastic label to a container is disclosed to provide a tamper resistant cover, the label being applied by a transfer arm and head that rapidly supplies labels to the containers with a woodpecker-like action. There is also disclosed the novel container and cover therefore, the conical label being efficiently applied to the container and easily heat shrunk thereon.

14 Claims, 13 Drawing Figures

APPARATUS AND METHOD FOR APPLYING HEAT SHRINKABLE CONICAL PLASTIC LABELS ON CONTAINERS

The present invention relates to apparatus and methods for applying heat shrinkable conical plastic sleeves to containers to provide a pilfer-proof top outer closure thereon or a bottom label thereon. The present invention also relates to a product made by the aforesaid apparatus and methods, the product preferably comprising a container having a top adapted for a closure, and a heat shrinkable plastic label over the container top and closure.

It is an object of the present invention to provide an improved apparatus and method for applying a performed conical heat shrinkable plastic sleeve label to a container to provide a pilfer-proof top cover for the container on a pleasing, tightly fitting base cap label for the container.

It is an object of the present invention to provide an apparatus and a method for applying conical heat shrinkable plastic labels to containers in a rapid efficient way that is adapted to high speed production.

It is an object of the present invention to provide an apparatus for applying preformed conical plastic labels to a container, the apparatus comprising means for holding a stacked column of preformed conical labels, the labels being of a generally cylindrical cross section and having no top or bottom, the labels being of a frusto-conical outline, transferring means for picking a label from the supply stack and applying it to a container in a woodpecker-like action, the label being turned about 180° from its position at the bottom of the stacked column.

It is an object of the present invention to provide a process for applying hollow conical heat shrinkable labels to the top of a container, the process comprising the steps of:

A. providing a supply of stacked conical plastic labels generally above a line of moving containers, each container having a closure,
B. picking a label from the bottom of the stack,
C. applying the hollow label over the top of the container in a woodpecker-like action, and
D. heat shrinking the label tightly around the top of the bottle, the upper edge of the label overlapping the closure.

It is an object of the present invention to provide a container with a top and a closure therefor, and a heat shrunk cover for the top, the cover formed from a hollow frusto-conical plastic sleeve with a lower sidewall portion forming a top opening, the upper sidewall portion of the cover overlying the outer periphery of the top of the closure and the lower sidewall portion of the cover heat shrink tightly around the container.

These and other objects will be apparent from the specification that follows, the appended claims, and the drawings, in which:

Figure 1:
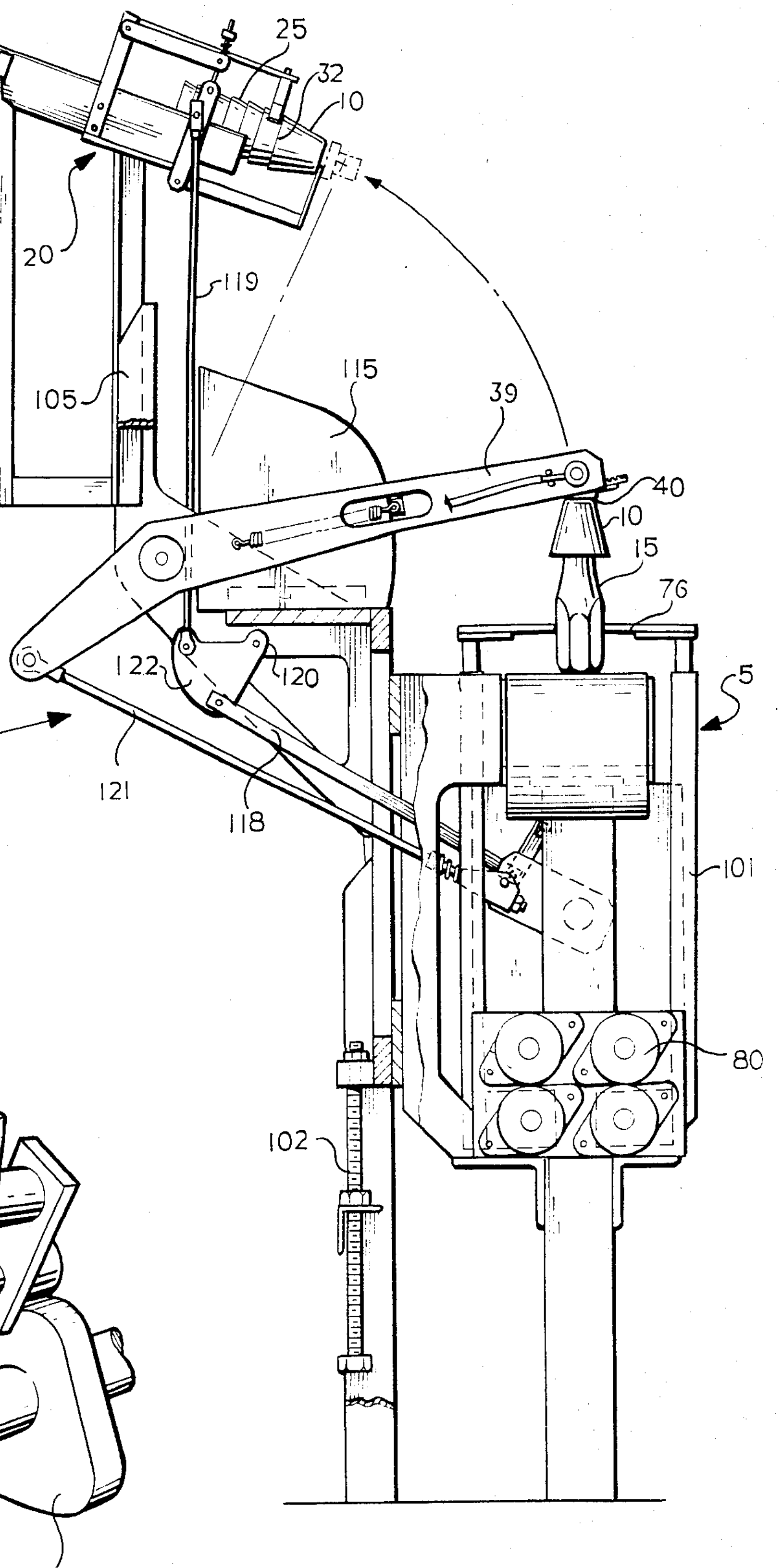
FIG. 1 is a side elevational view of the apparatus of the present invention with parts being broken away and shown in section.

The present invention provides apparatus for continuously applying plastic heat shrinkable frusto-conical cones to containers, the apparatus comprising means for moving continuously containers to and past a cone-applying station, means for aligning and moving the containers one by one past the station, means for grasping a cone from a generally overhead stack of cones, and means for changing the position of the grasped cone 180° and applying the cone to a container.

The present invention also provides a method of continuously applying a frusto-conical heat shrinkable plastic cone to a container, the method comprising the steps of continuously transporting a plurality of containers in an upright position past a cone-applying station, aligning the containers to provide them one at a time in an upright position past the station, grasping a cone from a generally overhead stack of cones, twisting the cone 180°, applying the cone to the top of the container to provide a pilfer-proof top, and moving the cone capped container away from the station for heat shrinking of the cone.

As previously indicated, the present invention provides a container with a top and a closure therefor, and a heat shrunk cover for the top, the cover formed from a hollow frusto-conical plastic sleeve with a lower sidewall portion forming a bottom opening and an upper sidewall portion forming a top opening, the upper sidewall portion of the cover overlying the outer periphery of the top of the closure and the lower sidewall portion of the cover heat shrunk tightly around the container.

As seen in the drawings, an apparatus 5 is shown for applying preformed plastic labels 10 to a container 15. the apparatus including structure means 20 for holding a stacked column 25 of preformed conical labels 10, the labels having a generally circular cross section 30 and having a top opening 32 and a bottom opening 34.

The labels 10 generally have a frusto-conical outline and the bottom opening is formed by an annular ridge or ledge 33 of material.

The apparatus 5 includes transferring means 37 for transferring the labels to the containers, the transferring means including a transfer arm 39 and a transfer head 40. The transfer head 40 fits snugly in the bottom opening 34 of the label, the label being held on the transfer head by annular ledge 33 of the bottom cup material.

The labels 10 are picked from the stack 25 by the transfer head 40 and applied with a woodpecker-like action to generally the top of the container by rapid motion of the transfer arm 39. The label 10 is turned 180° by the action of the arm 39 and efficiently and quickly placed on the top of the container. The plastic label 10 is heat shrunk on the container 15 to provide a pilfer-proof product.

The invention provides a rapid-fire efficient method of continuously applying the heat shrinkable cones 16 to a container, the method including the steps of (A) continuously transporting by conveyor means 45 a plurality of containers 15 in an upright position past a cone label applying station 50, (B) aligning the containers to provide them one at a time in an upright position past the station 50, (C) grasping the bottom cone label 10 from the generally overhead stack of cones.

(D) twisting the cone 180°, (E) applying the cone to the top of the container to provide a pilfer-proof top 55; and (F) moving the cone-capped container away from the station for heat shrinking of the cone.

A novel feature of the method of the present invention includes a step of sensing the presence of one of the containers just prior to moving to the cone-applying station 50, and a step of stopping the action of grasping a cone from the stack in the event there is no container sensed.

The present invention provides an outstanding, inexpensive, yet rapid and efficient apparatus for moving continuously containers on the conveyor 45 to and past the cone label-applying station 50, grasping the bottom cone from the stack 25, the grasping means including a frusto-conical shaped plunger 60 that penetrates the bottom opening 34 of the cone label and impales thereon the bottom cone. Air means 63 is provided to move the plunger to impale the cone. A puff of secondary air 65 is supplied between the impaled cone and the next cone in the stack to separate the impaled cone therefrom to prepare for movement to the cone-applying station.

The cone label is twisted 180° before application to the container. The annular ledge 33 of material at the cone bottom serves as a guide to locate the container 15.

There is a photo-cell detector 70 for detecting the presence of a container about to proceed to the cone-applying station. If there is no container in position, no cone label will be delivered by the transfer arm. If a container is present and detected by the photo-cell 70 arrangement, a solenoid valve acts to send air to the plunger 60 and extends the plunger to its label impaling position.

Aligning means is provided for aligning the containers into single file and feedig them one-by-one to the cone-applying station. The aligning means includes escapement fingers 74, 75, and 76 which operate as an aligning and feed control means for the containers on the conveyor. Escapement cams 80, 81 and 82 operate the fingers 74, 75 and 76, respectively.

As seen in the drawings, a motor 85, by suitable gears and drive shafts, drives the conveyor, the escapement cam and a crank 88 for the transfer arm 39.

The aligning means for the feed control or container escapement to allow the containers to be labeled one at a time includes escapement fingers 74, 75 and 76 that are opened and closed in timing sequence by the timing cams 80, 81 and 82.

Figure 10:
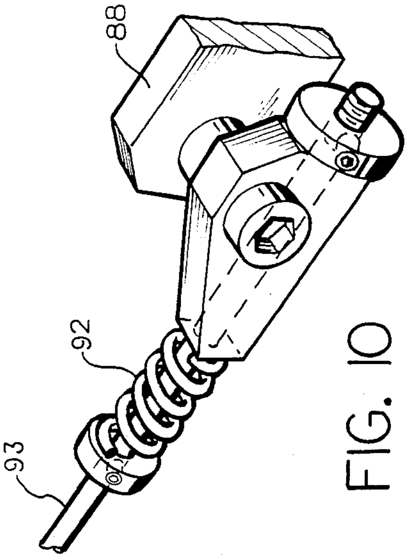
FIG. 10 is a fragmentary perspective view of the crank arm for operating the transfer arm, and the spring-loaded connecting arm to protect against misaligned containers.
Figure 11:
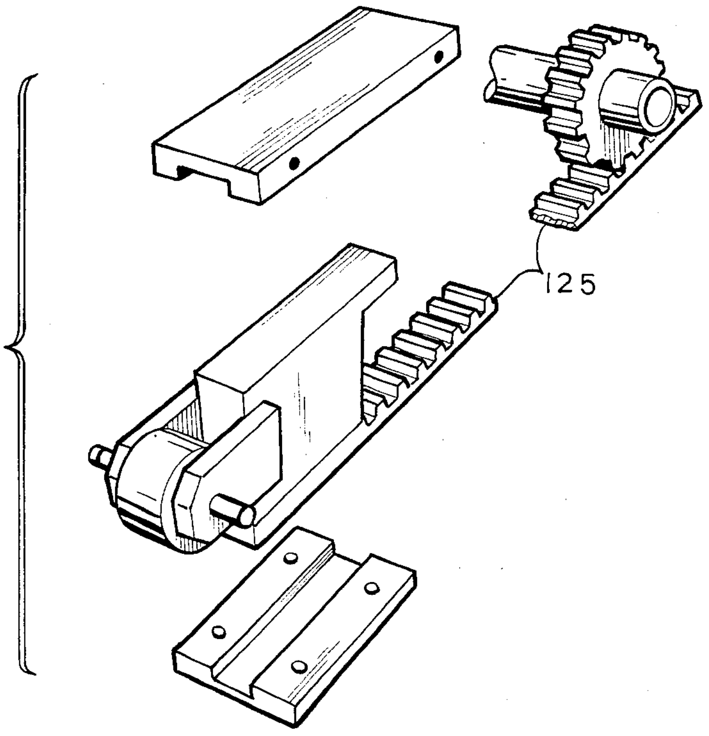
FIG. 11 is a fragmentary perspective view of the rack and pinion gears for rotating the label-taking assembly.

As seen in FIG. 10, a spring 92 is provided for the connecting rod 93 to springload the rod to protect against trouble due to misaligned containers.

Figure 9:
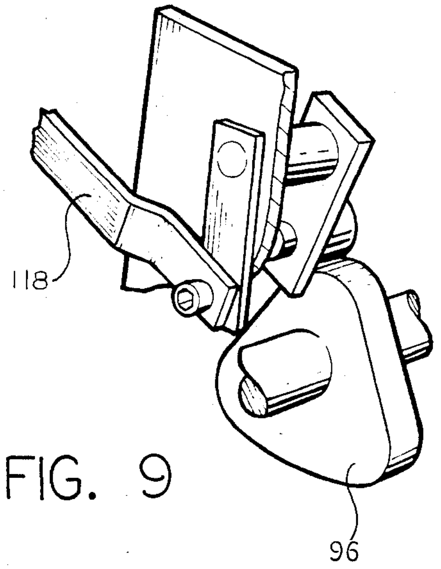
FIG. 9 is a fragmentary perspective view showing the control cam for the label escapement control.
Figure 2:
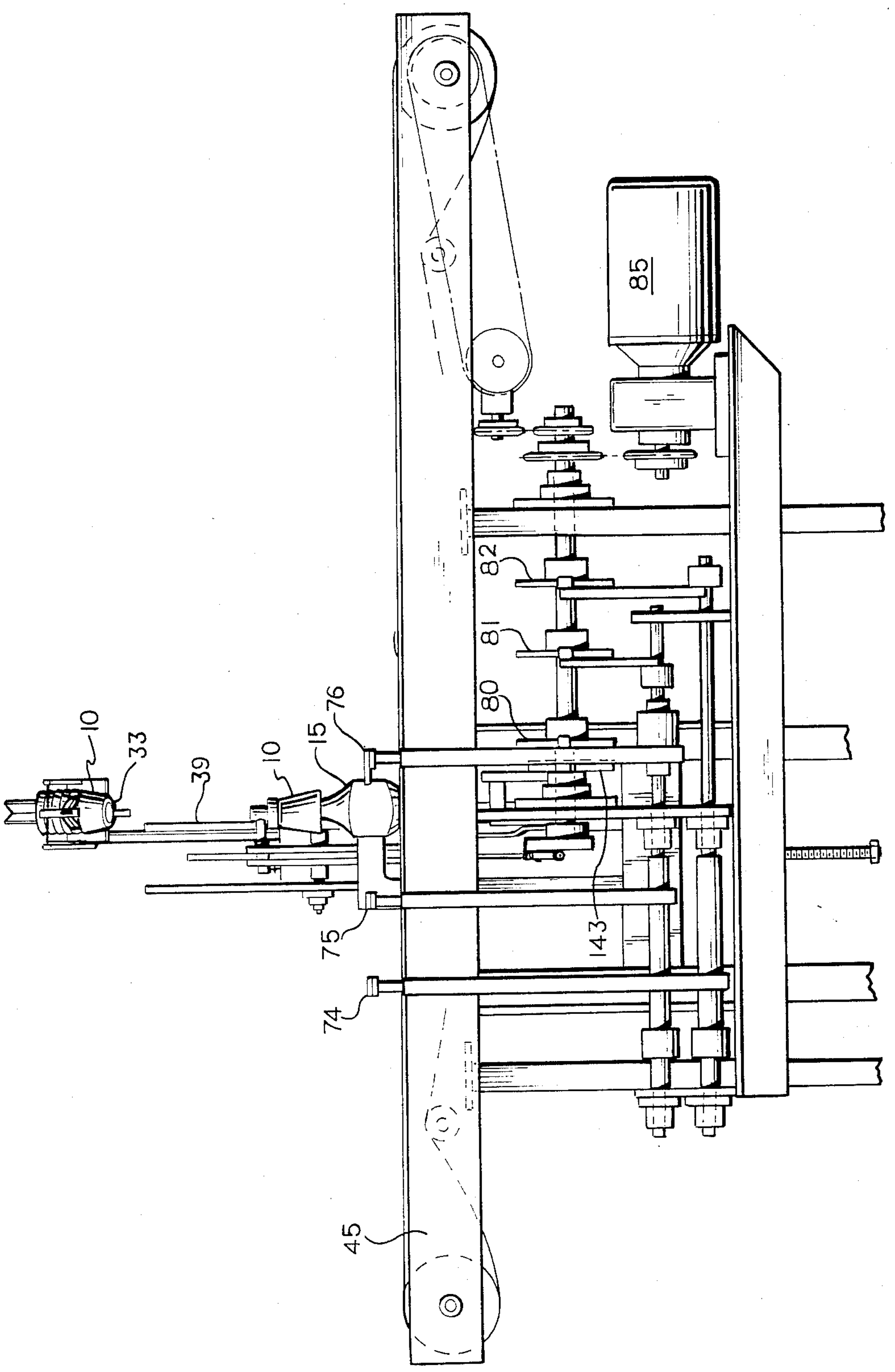
FIG. 2 is a front elevational view of the apparatus of FIG. 1.
Figure 3:
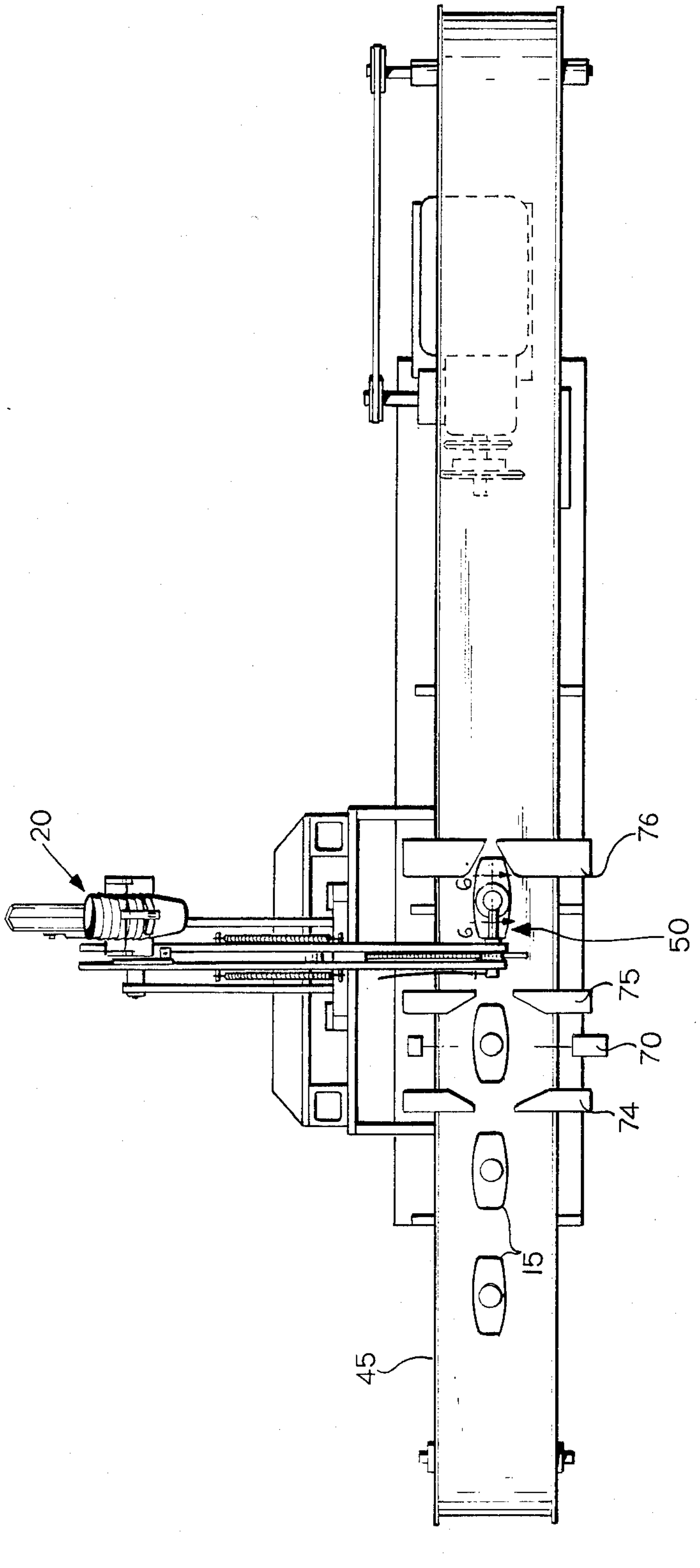
FIG. 3 is a top plan view of the apparatus of FIG. 1.
Figure 4:
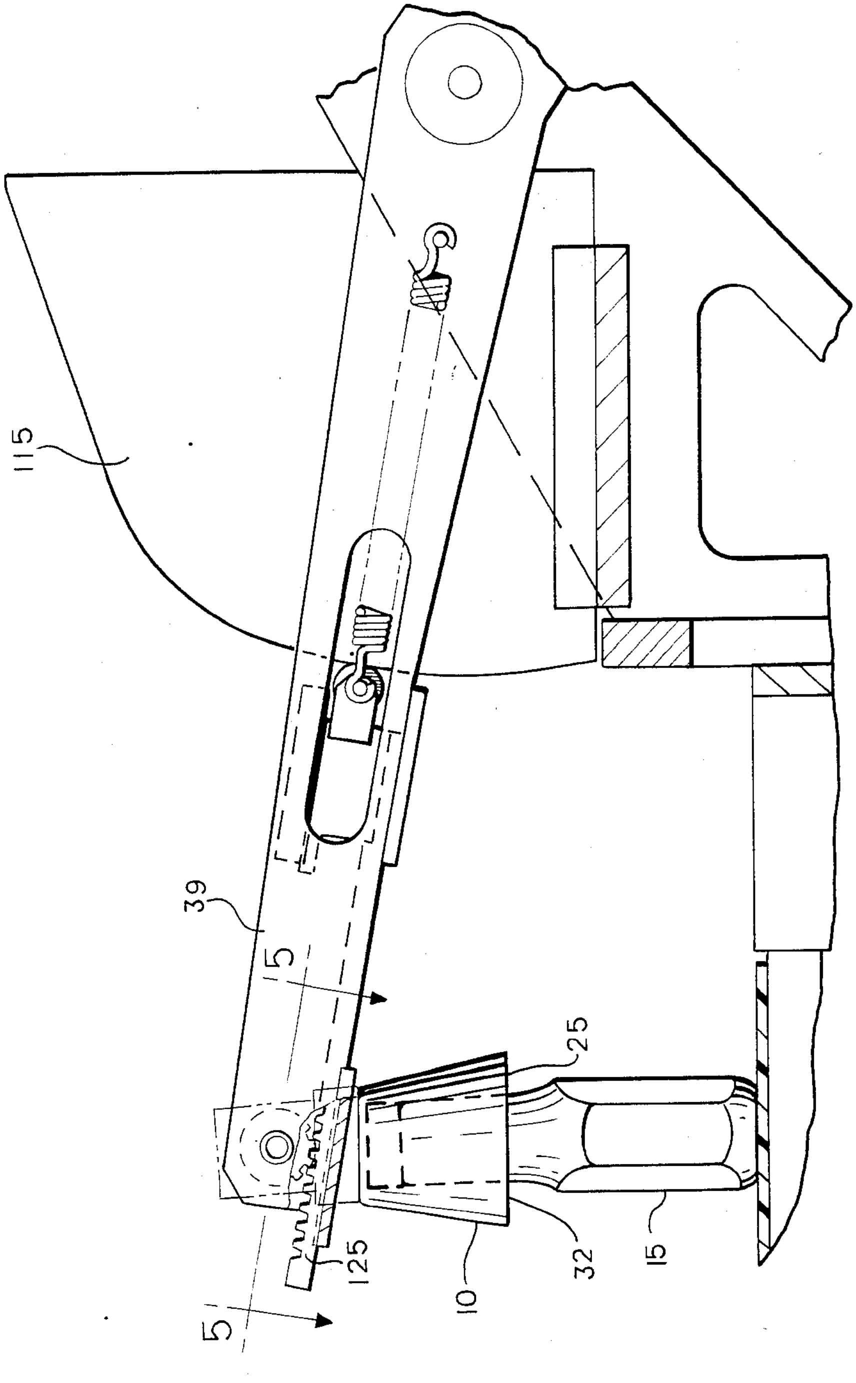
FIG. 4 is a fragmentary enlarged view of the conical label applying apparatus and process.

As seen in the enlarged view in FIG. 9, a control cam 96 is shown for the label escapement control.

As seen in FIG. 1, the label-applying station is mounted on an adjustable frame 101 including a vertically adjustable bolt 102. The label holding frame is also mounted on adjustable support legs 104 and 105 that can accommodate various size and shapes of stacked labels.

The transfer arm swings on an arc from the label-applying station to the bottom of the stack of conical labels. The end of the arm with the head operates in a woodpecker-like action on the downward stroke after grabbing.

A cam 115 is provided with a shape such that the label on the transfer arm head is twisted 180° for fast application to the container. As seen in the drawings a cam follower 117 is mounted on the transfer arm to provide the motion to the arm. Connecting rods 118, 119 and 120 are provided, the rods 119 and 120 being connected to a pivoting member 122 that is generally of a triangular outline.

Figure 6:
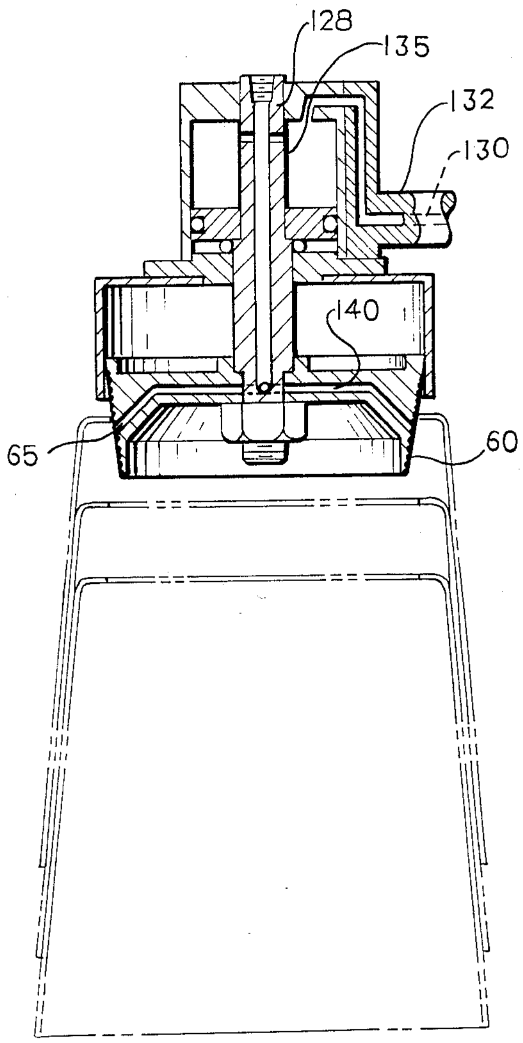
FIG. 6 is a sectional view taken along the lines 6—6 in FIG. 3.
Figure 5:
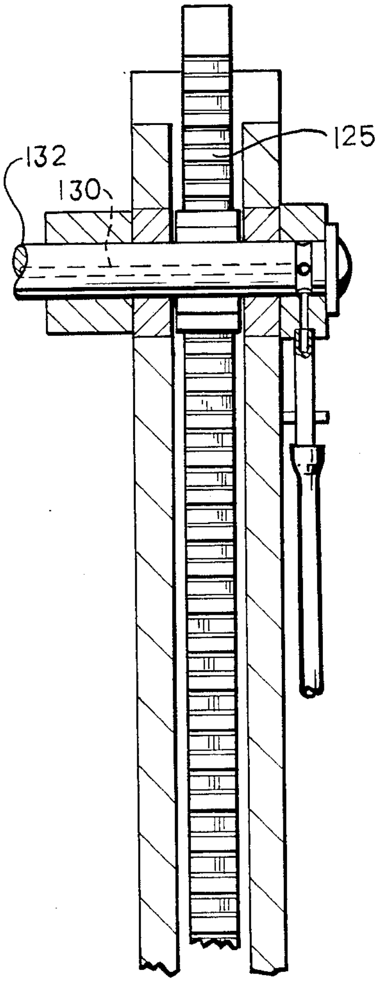
FIG. 5 is a sectional view taken along the lines 5—5 in FIG. 4.
Figure 7:
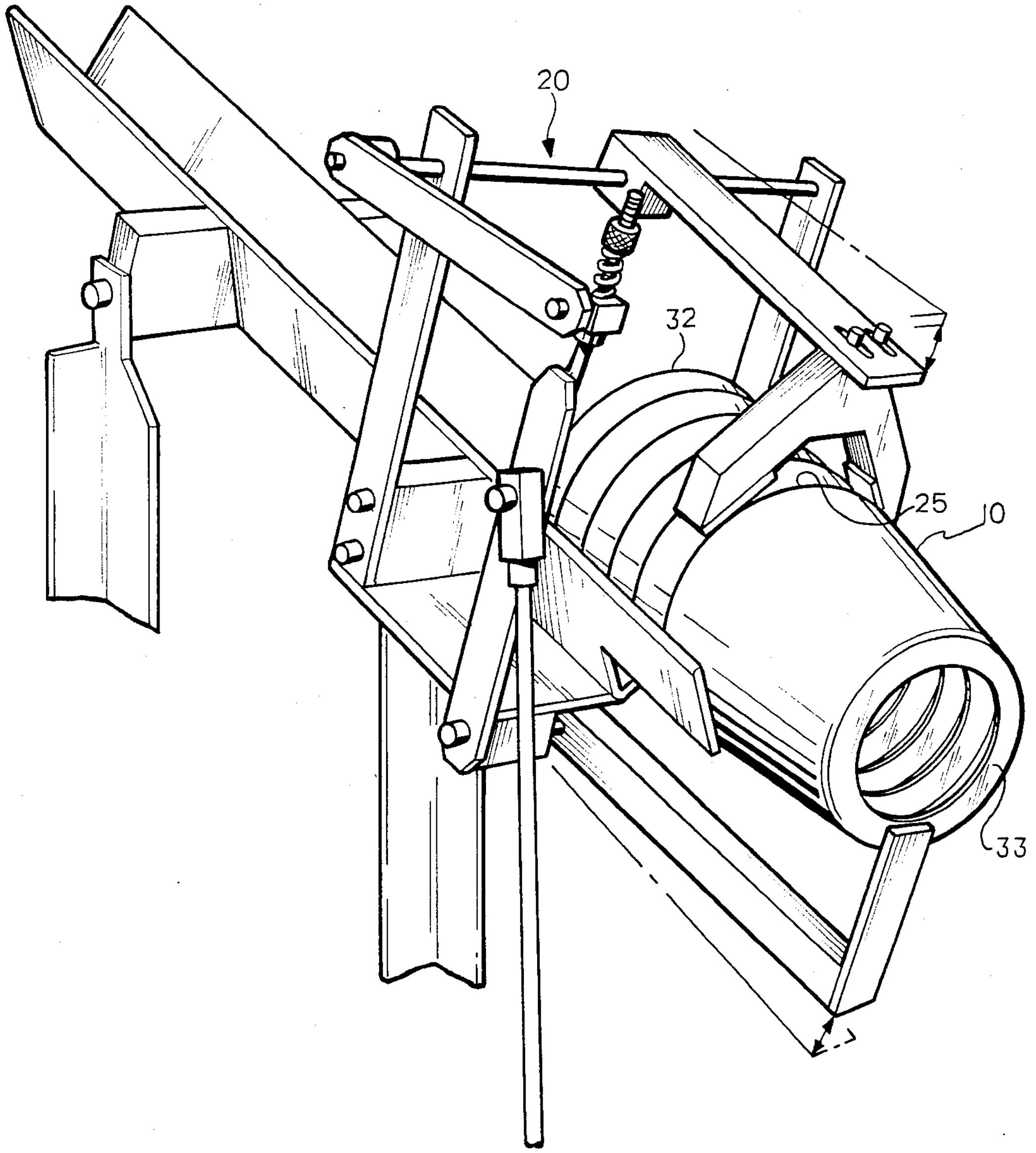
FIG. 7 is a fragmentary perspective view of the label-holding and dispensing apparatus.
Figure 8:
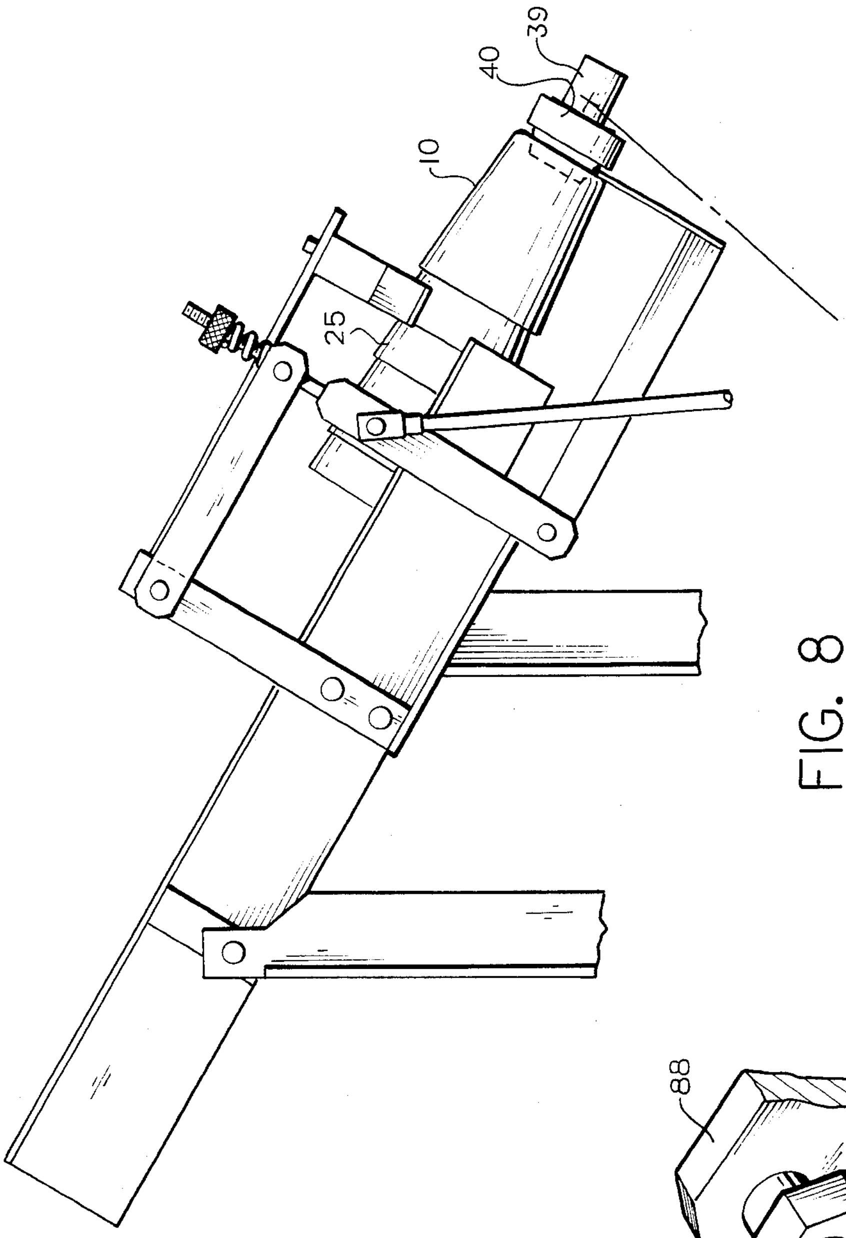
FIG. 8 is a fragmentary side elevational view of the label-holding apparatus.

A rack and pinion gear assembly 125 is provided at the end of the transfer arm to rotate the label-taking assembly. As best seen in FIG. 6, a head connecting member 128 is connected to the rack and pinion, the connecting member 128 having an air channel 130 connected to an air supply line 132. When a container is sensed approaching the label-applying station, air from an air supply, that is opened by a sensing signal when the electric eye detects a container, with a solenoid valve is delivered through line 132 and air channel 130 to the transferring head.

As best seen in FIG. 1, the head plunger central shaft 135 is shown in dotted lines in the retracted position. It does not take a label in this position and must be activated downwardly by air flow channel 130 that forces the plunger down into the bottom opening of the conical label. A puff of secondary air 65 at 140 loosens the bottom label from the stack so it can be carried quickly to the label applying station.

The woodpecker action of the transfer arm and head is provided in part by the mounting on an eccentric and the rack and pinion gear assembly to rotate the label-taking assembly including the head 180° to change the position of the bottom of the cup to a position with the top leading the label over the top of the container in the case of a bottle or the bottom of the cup as in the case of a peanut jar.

Figure 12:
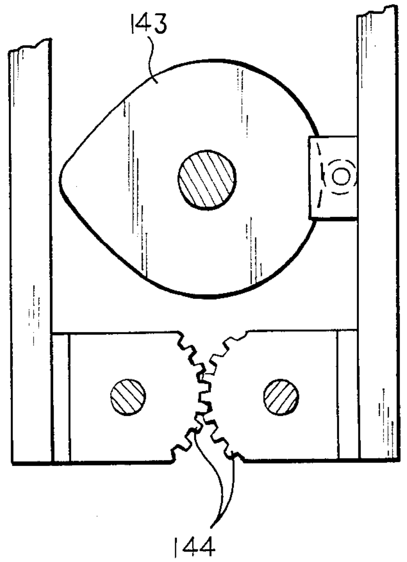
FIG. 12 is a fragmentary side elevational view of the escapement control gears and cam.

As seen in FIG. 12, a cam 143 is provided to control the container escapement and gears 144 are provided for synchronizing the escapement fingers.

Figure 13:
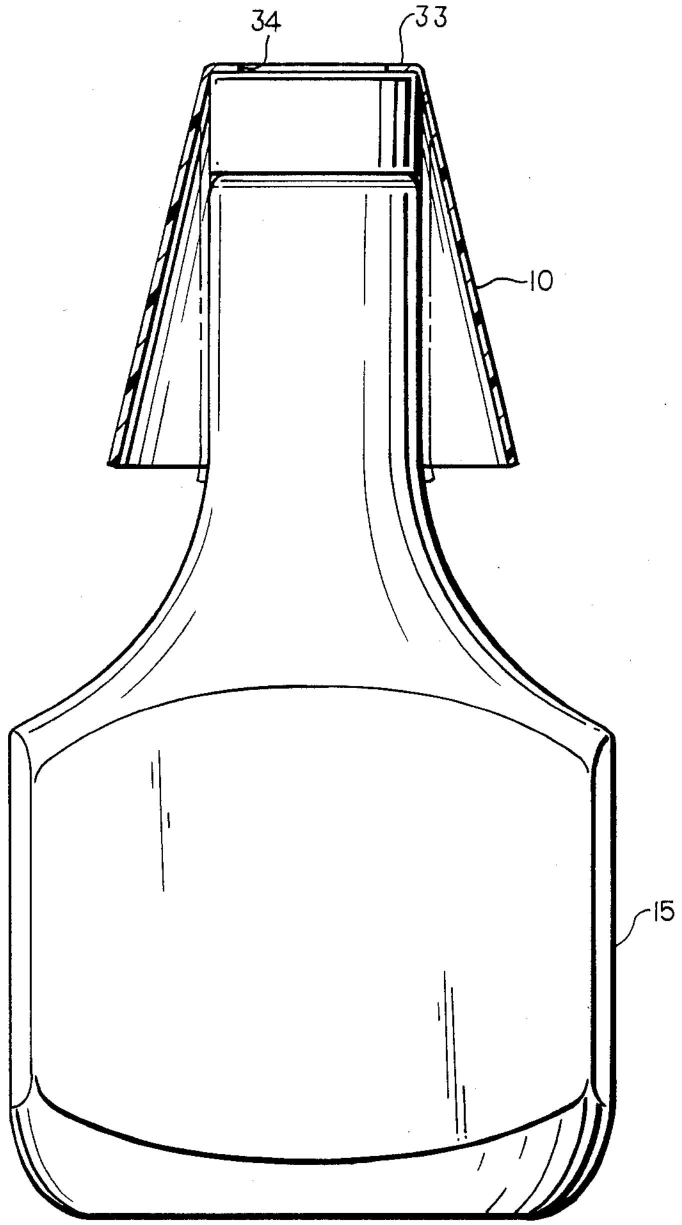
FIG. 13 is a side elevational view of a container with a conical label applied on the top.

As shown in FIG. 13, the ledge on the top of the cone label centers and locates the label over the top of the container such as a bottle for ketchup.

A novel structure is provided with the container and the heat shrinkable cone label for the top or bottom of the container. In a preferred embodiment as shown in FIG. 13, a cone label is applied to the top of the container, it fitting concentrically around the top and the top of the cone disposed over the shoulder of the container. This label is quickly and effectively used to form a container cover by drawing a heat shrunk label down tightly over the top to form a tamper resistant cover, 55 as shown in dotted lines.

What is claimed is:

1. An apparatus for applying preformed conical plastic labels to a container, the apparatus comprising: means for holding a stacked column of preformed conical labels, the labels being of a generally cylindrical cross section and having no top or bottom, the labels being of a frusto-conical outline, transferring means for picking a label from the supply stack and applying it to a container in a woodpecker-like action, the label being turned about 180° from its position at the bottom of the stacked column, there being a transfer head on the transfer arm to pick a label from the bottom of the column, means for retracting the end portion of the head so the head will not take a label from the column, means to move the end of the head outwardly therefrom to seat within the bottom opening of the label and grasp the label, and means for separating the grasped label from the column including air blowing between the column and the inside of the grasped label.

2. An apparatus as defined in claim 1 in which the transferring means includes a crank arm for operating a transfer arm that picks the label from the bottom of the stacked column.

3. An apparatus as defined in claim 1 in which there is provided aligning means for aligning the containers into single file and feeding them one by one to the transferring means and there being label escapement means including a control arm for a label escapement control to allow one label to be placed on one container.

4. An apparatus as defined in claim 1 in which the transfer arm includes a spring to take care of misalignment of a container to the path of a label for the container.

5. An apparatus as defined in claim 1 in which there is provided means for adjusting the height and width of a support for the stacked column to accommodate various lengths and diameters of the columns.

6. An apparatus as defined in claim 1 in which cam means is provided to rotate a transfer arm head about 180° during the transfer of a label from its column to a container.

7. An apparatus as defined in claim 1 in which there is provided escapement finger means to align the incoming containers and feeding one container at a time to the transfer arm.

8. An apparatus as defined in claim 1 in which there are adjustable means for adjusting the vertical height of the lowest portion of the travel of the transfer arm so as to accommodate various heights of containers.

9. An apparatus as defined in claim 1 in which there is provided means including a rack and pinion, a cam and a cam follower to rotate the label about 180° from the bottom of the stack where it is grasped by the transfer arm head to the top of the container.

10. An apparatus as defined in claim 1 in which there is provided cam means to control the escapement of the incoming containers and gears for synchronizing the action of escapement fingers in feeding the containers one at a time to the transfer arm operation.

11. Apparatus for continuously applying plastic heat shrinkable frusto-conical cones to containers, the apparatus comprising: means for moving continuously containers to and past a cone-applying station, means for aligning and moving the containers one by one past the station, grasping means for grasping a cone from a generally overhead stack of cones, and means for changing the position of the grasped cone 180° and applying the cone to a container, the grasping means including a frusto-conical shaped plunger that penetrates the hole of the bottom of the cone and impales thereon a cone, there being air means to move the plunger, and there being also a secondary air means to supply a puff of air between the impaled cone and the next cone in the stack to separate the impaled cone therefrom to prepare movement to the cone-applying station.

12. An apparatus as defined in claim 11, in which there is provided sensing means to sense the presence of a container as the container moves to the station, and means to prevent the grasping of a cone in the event no container is sensed by the sensing means.

13. An apparatus as defined in claim 11 in which the grasping means includes a plunger that travels by an annular ledge on the cone that defines the bottom of the cone, the plunger contacting the inside of the cone sufficiently to remove the bottom cone of the stack, and there being air means to separate the grasped cone from the rest of the stack including blowing air between the grasped cone and the stack.

14. An apparatus for continuously applying a conical label to one of a series of moving containers, the apparatus comprising: means for holding a supply of conical labels having a frusto-conical outline and a bottom opening, label pick-up means for grasping one label, means for transporting the label to a container, means for sensing the presence of a container, and means for cutting off the grasping function when there is no container present, the label pick-up means including a plunger that penetrates the bottom opening of the label to impale a label on the plunger, the pick-up means including separating means to separate the grasped label from the rest of the supply of labels.

* * * * *